United States Patent Office 2,824,072
Patented Feb. 18, 1958

2,824,072
GERMANIUM-ACTIVATED PHOSPHOR

Keith H. Butler, Marblehead, Mass., assignor to Sylvania Electric Products Inc., Salem, Mass., a corporation of Massachusetts No Drawing. Application March 17, 1951
Serial No. 216,253

2 Claims. (Cl. 252—301.4)

This invention relates to phosphors for fluorescent lamps, cathode ray tubes, X-ray screens and the like.

Such phosphors generally comprise a main crystal matrix with a comparatively small number of activator atoms scattered therethrough. The activator atoms may in some cases replace certain of the other atoms in the matrix, and in others be positioned interstitially in the matrix.

Phosphors in which the main constituent of the matrix is a germanate have been well known. In these the presence of an activator other than germanium was necessary to produce fluorescence, for example as in manganese-activated zinc orthogermanate. The germanium itself was not an activator.

In a phosphor according to the present invention, however, the method of preparation is such that the formation of germanates is unlikely, and X-ray examinations of the final phosphor gives no indication of the presence of a germanate. Moreover, the germanium is used in such small amounts as to be effective only as an activator.

The invention therefore provides a germanium-activated phosphor, and in particular an alkaline earth metal phosphate phosphor activated with germanium.

An advantage of such a phosphor is that its visible emission can be shifted from blue through white to red by increasing the germanium content and slightly decreasing the ratio of calcium to phosphate-radical.

I have discovered that tri-calcium phosphate having slightly less than three gram-atoms of calcium per mole of the phosphate radical, and activated with small amounts of germanium, will fluoresce when exposed to short wave ultra-violet radiation, cathode rays, X-rays and the like, and is particularly fluorescent when excited by the 254 millimicron wavelength of mercury, commonly used in fluorescent lamps.

In order to secure proper fluorescence from my phosphors, a mildy reducing atmosphere is necessary during the firing of the phosphor and during the subsequent cooling. The effect of such an atmosphere is to reduce some or all of the germanium from the tetravalent to the divalent state.

In the manufacture of phosphors according to my invention, I prefer to use a mixture of secondary calcium phosphate, calcium carbonate, and germanium dioxide as the component raw materials, but various substitutions can be made for each of the three ingredients, as long as the final fired product is a germanium-activated calcium phosphate.

After the correct proportions of the raw materials are mixed intimately, I then fire the mixture in open silica trays or crucibles in air at a temperature in the neighborhood of 2000° F. This prefiring eliminates extraneous materials, such as combined water, and combined carbon dioxide, and forms a calcium phosphate matrix with the germanium in solid solution, presumably as a tetravalent ion.

The resulting powder, which is substantially non-fluorescent, is then crushed and refired in a controlled atmosphere. I prefer to use a mixture of hydrogen with pure nitrogen for this controlled atmosphere but carbon monoxide or other reducing gases can replace the hydrogen, while the nitrogen can be replaced by other inert gases such as argon.

The fluorescent materials prepared in this way can be readily excited by radiation of 254 millimicrons wavelength, which is obtained in a low pressure mercury arc and will have emission colors ranging from a deep blue through yellowish white to a deep red. The color of the fluorescent light obtained depends on variations in the germanium content, in the ratio of calcium to the phosphate radical, and also on the amount of hydrogen in the reducing gas.

Low germanium contents, high firing temperatures, high hydrogen contents and high $Ca/PO_4$ ratio all tend to shift the color toward the blue, while red colors of fluorescence are obtained if these variables shift toward the other extreme of their allowable ranges.

The ratio of calcium to phosphate is extremely important in determining whether useful materials are obtained. If the stoichiometric ratio for calcium orthophosphate of 3 gram atoms of calcium to 2 gram moles of the phosphate radical is employed, the materials show practically no fluorescence and this is true also if the calcium is still higher. In contrast, if the calcium content is reduced slightly, useful phosphors are obtained and they become quite bright when the ratio is 2.96/2.00. With further reduction in this ratio down to 2.70/2.00 the brightness remains high though there is a shift in color. Still further reduction below 2.70/2.00 down to 2.00/2.00 and even below this latter value, has been found to give phosphors somewhat lower in brightness but still very useful.

The germanium content can vary considerably. As little as 0.002 gram atoms of germanium or as much as 0.20 gram atoms to each 2.00 gram moles of phosphate may be employed in the raw material mixture with excellent results.

The hydrogen content of the preferred mixture of hydrogen and nitrogen is not critical. The percent $H_2$ has been varied between 0.2 and 20% for certain phosphors without any considerable loss of brightness. In general, phosphors with a high germanium content do not respond well when high $H_2$ contents are used, while the best results are obtained with $H_2$ contents between 0.5 and 5%.

The temperature of refiring may be as high as 2200° F. or higher, and may be dropped as low as 1700° F. in some cases, though best results are obtained at 2000° F.

Table 1 below gives examples of some of the phosphors I have prepared. In this table the output is expressed as the percentage of the reading on an arbitrary calcium halophosphate standard when measured in a photometer employing a photovoltaic cell with filters. The filters used are the Wratten A, B, and C tricolor filters.

Table 1

| Gram Atoms | | Gram Moles $PO_4$ | Refiring | | Photometer Readings | | |
|---|---|---|---|---|---|---|---|
| Ca | Ge | | Temp., °F. | Percent $H_2$ | Red | Green | Blue |
| 2.88 | 0.005 | 2.00 | 2,100 | 0.56 | 35 | 31 | 90 |
| 2.88 | 0.02 | 2.00 | 2,100 | 1.40 | 52 | 34 | 60 |
| 2.88 | 0.08 | 2.00 | 1,900 | 0.56 | 52 | 19 | 140 |
| 2.88 | 0.08 | 2.00 | 1,900 | 2.80 | 53 | 17 | 110 |
| 2.96 | 0.02 | 2.00 | 2,100 | 1.40 | 17 | 37 | 100 |
| 2.80 | 0.02 | 2.00 | 1,900 | 0.56 | 37 | 15 | 85 |

The output of these phosphors can be described as the sum of four emission bands, whose relative magnitude depends on composition and firing conditions. One of these is peaked at 400 millimicrons, another at 640 millimicrons, while the third and fourth appear at 500 and 680 millimicrons.

Because of the filters and photocells available, the blue readings in the above table include the energy in the 400 millimicron band, most of which is in the extreme violet, to which the eye is not very sensitive, and in the ultraviolet, to which the eye does not respond at all. Accordingly, the "blue" reading is exaggerated, and the "blue" results in the above table are higher than those corresponding to a true blue emission.

Actually, the visible emission colors of certain representative phosphors in the above table are as follows, the gram atoms being taken per two gram moles of phosphate radical:

*Table 2*

| Gram Atoms | | Emission Color |
|---|---|---|
| Ca | Ge | |
| 2.96 | 0.02 | Blue. |
| 2.88 | 0.02 | White. |
| 2.88 | 0.08 | Red. |

This table shows that, for 0.02 gram-atoms germanium the color is changed from blue to white by dropping the calcium from 2.96 to 2.88 gram-atoms, and that then, by simply increasing the germanium content, the color can be shifted to red.

What I claim is:

1. A germanium-activated calcium phosphate phosphor, in which the ratio of the number of gram-atoms of calcium to the number of gram-moles of the phosphate radical is less than 3.00/2.00 but greater than 2.70/2.00, and in which the germanium is divalent and its content is between about 0.002 gram-atom and 0.2 gram-atoms to two gram moles of phosphate radical.

2. A germanium-activated calcium phosphate phosphor in which the ratio of the number of gram-atoms of calcium to the number of gram-moles of the phosphate radical is less than the stoichiometric for the orthophosphate, and in which the germanium is at least partly in the divalent state.

References Cited in the file of this patent
UNITED STATES PATENTS
2,619,471     Butler _____ Nov. 25, 1952